United States Patent [19]
Lin

[11] Patent Number: 5,474,590
[45] Date of Patent: Dec. 12, 1995

[54] SPINNER FOR MANUFACTURING DUAL-COMPONENT FIBERS HAVING AN ANGLED ARRAY OF ORIFICES

[75] Inventor: David C. K. Lin, Worthington, Ohio

[73] Assignee: Owens-Corning Fiberglas Technology, Inc., Summit, Ill.

[21] Appl. No.: 254,851

[22] Filed: Jun. 6, 1994

Related U.S. Application Data

[63] Continuation-in-part of Ser. No. 147,762, Nov. 5, 1993, abandoned.

[51] Int. Cl.⁶ .................. C03B 19/04; C03B 37/023; C03B 37/075
[52] U.S. Cl. .................. 65/202; 65/504; 65/521; 264/211.1; 264/DIG. 26; 264/DIG. 29; 264/168; 425/8; 425/DIG. 217
[58] Field of Search .................. 65/502, 504, 516, 65/521, 438, 459, 470; 264/211.1, DIG. 26, DIG. 29, 168, 174, 8; 425/8, DIG. 217

[56] References Cited

U.S. PATENT DOCUMENTS 2,998,620  9/1961  Stalego .
3,073,005  1/1963  Tiede .
3,387,327  6/1968  Privott .................. 264/168
3,541,198  11/1970  Kiezoueda .................. 264/168
4,293,516  10/1981  Parkin .................. 264/168

Primary Examiner—David A. Simmons
Assistant Examiner—John Hoffman
Attorney, Agent, or Firm—Ted C. Gillespie; C. Michael Gegenheimer; Timothy W. Hagan

[57] ABSTRACT

Apparatus for making dual component fibers is provided and includes a spinner having a peripheral wall. The spinner includes orifices located on the peripheral wall thereof for centrifuging the dual component fibers, with the spinner being divided into a series of compartments by baffles positioned circumferentially around the interior of the peripheral wall. The baffles are positioned at an angle of from about 5° to about 75° from vertical, and most preferably about 45° from vertical. The number of orifices on the spinner peripheral wall can thus be increased to increase the throughput of fibers from the spinner while still maintaining a minimum required spacing between orifices for the structural integrity of the spinner.

10 Claims, 4 Drawing Sheets

5,474,590

SPINNER FOR MANUFACTURING DUAL-COMPONENT FIBERS HAVING AN ANGLED ARRAY OF ORIFICES

CROSS-REFERENCE TO RELATED APPLICATION

This application is a continuation-in-part of U.S. patent application Ser. No. 08/147,762, filed Nov. 5, 1993, abandoned, and entitled APPARATUS FOR MAKING DUAL-GLASS FIBERS.

BACKGROUND OF THE INVENTION

This invention relates to an apparatus for manufacturing dual component fibers from thermoplastic materials, and more particularly to a spinner apparatus for centrifuging dual component fibers from two streams of molten thermoplastic materials such as glass or other mineral fibers or polymer fibers.

Fibers of glass and other thermoplastic materials are useful in a variety of applications including acoustical or thermal insulation materials. Common prior art methods for producing glass fiber insulation products involve producing glass fibers from a rotary process. A single molten glass composition is forced through the orifices in the outer wall of a centrifuge commonly known as a spinner, producing primarily short, straight glass fibers.

A modification of conventional glass fibers, which are usually straight fibers, is the use of fibers which are curly (helical) in shape. These fibers can be made by joining two distinct glass streams, commonly referred to as the A glass and B glass streams, and centrifuging the dual glass stream into a curly (helical) fiber.

Stalego, U.S. Pat. No. 2,998,620, discloses curly (helical) glass fibers of bicomponent glass compositions. Stalego discloses producing staple curly fibers by passing two glass compositions having differing coefficients of thermal expansion through the orifices of a spinner. The glasses are extruded as a dual glass stream in aligned integral relationship such that the fibers curl naturally upon cooling due to the differences in their coefficients of thermal expansion. Stalego discloses in one embodiment a spinner having vertically aligned compartments separated by vertical baffles around the periphery of the spinner, with alternate compartments containing the different glasses. The patentee teaches that an orifice wider than the baffle is to be drilled where the baffle intersects the spinner peripheral wall. As the orifice is wider than the baffle, the orifice is in communication with both of the vertical compartments on either side of the baffle, and both the A glass and B glass will exit the spinner from the orifice, forming a dual glass stream.

However, there remains a need in this art for improving the delivery of dual streams of molten glasses to form dual glass or other thermoplastic fibers.

SUMMARY OF THE INVENTION

This need is met by the present invention in which a series of orifices are positioned in the spinner peripheral wall in a manner which minimizes fiber to fiber interference as the dual-component fibers are centrifuged from the spinner and which enables an increase of the number of orifices on the spinner face to increase the fiber output of the spinner. For purposes of this patent specification, in using the terms "glass fibers" and "glass compositions" "glass" is intended to include any of the glassy forms of materials such as rock, slag, and basalt, as well as traditional glasses. Thermoplastic materials and thermoplastic fibers include, in addition to glass and other mineral fibers, fibers from polymer materials such as polyester fibers and polypropylene fibers.

In accordance with one aspect of the present invention, an apparatus for making dual component fibers is provided and includes a spinner having a peripheral wall, with the spinner being divided into a series of compartments by baffles positioned circumferentially around the interior of the peripheral wall. The baffles are positioned at an angle of from about 5° to about 75° from vertical, and most preferably about 45° from vertical. In this manner, the number of orifices on the spinner peripheral wall can be increased while still maintaining a minimum required spacing between orifices for the structural integrity of the spinner.

The first and second molten thermoplastic materials are supplied to the spinner by any suitable equipment. For example, if the materials are glasses, the equipment will include melting furnaces and forehearths to supply the two molten glasses. A divider is provided in the spinner for directing the first molten thermoplastic material into alternate ones of the compartments and for directing the second molten thermoplastic material into the remaining ones of the compartments so that adjacent compartments contain different thermoplastic materials. The peripheral wall of the spinner includes a series of orifices therein.

The orifices are positioned in alignment with the baffles and are wider than the width of the baffles to provide communication between adjacent compartments to enable centrifuging of the first and second thermoplastic materials from single orifices to form dual component fibers. In one preferred form, the long axis of each of the orifices is generally horizontal, while in another preferred form, the long axis is generally normal to the baffles and thus at an angle from the horizontal.

To minimize fiber interference as the multiple fibers are centrifuged from the orifices, the orifices are sized to provide a throughput differential of the thermoplastic materials between orifices of from about 2:1 to 10:1. By varying the throughput, the distances that individual fibers are spun outwardly from the spinner peripheral wall will vary. Thus, when the fibers are turned downward by gravity and hot air blasts and are attenuated, they will be less likely to become entangled and broken into short segments.

Generally, the orifices are arranged in rows. To vary the throughput, the width of the orifices may be varied in stepwise fashion or linearly. Further, adjacent rows of orifices may be offset from one another.

In a preferred embodiment of the invention, the thermoplastic materials are glasses, and the spinner is adapted to receive two separate molten glass streams for fiberization into dual glass fibers.

Accordingly, it is a feature of the present invention to provide a series of orifices which are positioned in the spinner peripheral wall in a manner which minimizes fiber to fiber interference as the dual-component fibers are centrifuged from the spinner and which enables an increase of the number of orifices on the spinner face to increase the fiber output of the spinner. These, and other features and advantages of the present invention will become apparent from the following detailed description, the accompanying drawings, and the appended claims.

DETAILED DESCRIPTION OF THE PREFERRED EMBODIMENTS

The invention will be described in terms of apparatus for making irregularly-shaped (i.e., non-straight along their axial length) dual glass fibers, although it is to be understood that the invention encompasses apparatus for making not only other types of dual glass fibers such as curly (helical) fibers, but also dual component fibers of other thermoplastic materials such as polyester or polypropylene, or combinations of glass and polymer.

Figure 1:
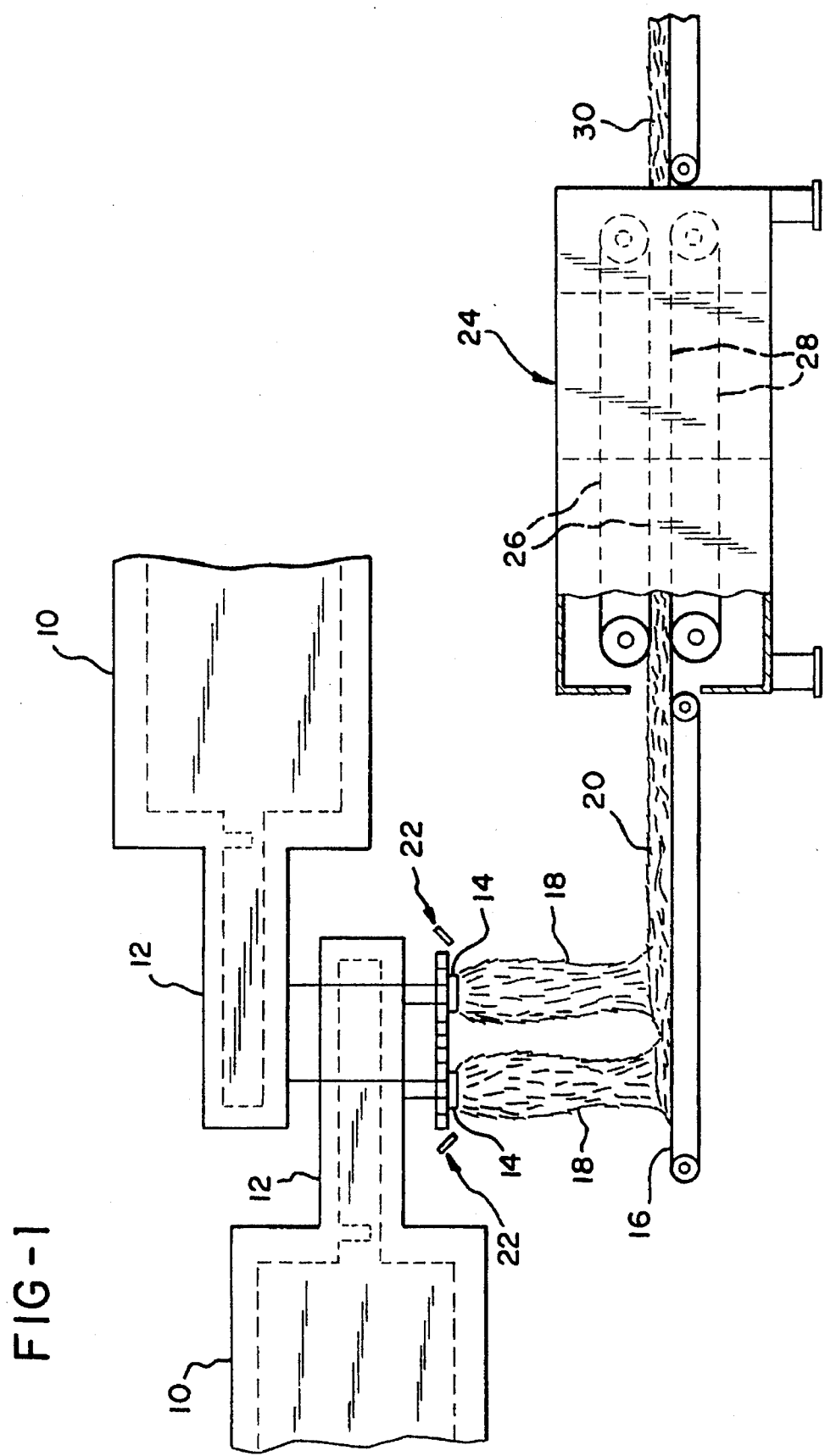
FIG. 1 is a schematic view in elevation of apparatus for making dual component fibers in accordance with the present invention.

The insulation products of irregularly-shaped glass fibers may be produced from a rotary fiber forming and pack heat setting process as shown in FIG. 1. Two distinct molten glass compositions (A glass and B glass) are supplied from any suitable source of glass such as furnaces 10 and forehearths 12 to rotary fiberizers 14. Preferably, the glasses have different mechanical attributes so that upon cooling, they will assume an irregular (as opposed to straight) configuration. Such different mechanical attributes may be, for example, differing coefficients of thermal expansion, differing melting points, differing viscosities, or differing mechanical strengths. Veils 18 of dual glass fibers, such as irregularly-shaped glass fibers produced by the fiberizers, are collected on conveyor 16 as wool pack 20 by means of a vacuum positioned beneath the conveyor (not shown). As the fibers are blown downwardly by air or gases to conveyor 16 by means of blowers 22 adjacent the fiberizers, they are attenuated, cool, and attain their irregular shape.

The wool pack 20 may then optionally be passed through oven 24 at heat setting temperatures of from about 700° to 1200° F. (371° to 650° C.). The heat setting temperature may be achieved either by retarding the fiber cooling process after fiber forming to retain some of the heat from the fiber forming process, or by reheating the fibers in heat setting oven 24. While passing through the oven, wool pack 20 is shaped by top conveyor 26 and bottom conveyor 28, and by edge guides (not shown). While in oven 24, the glass fibers may be subjected to flows of hot gases to facilitate uniform heating. When the fibers are constrained by conveyors 26 and 28, the fibers are stressed in the manner of a compressed spring. When subjected to heat setting temperatures, the fibers relax, reducing stress, so that the wool pack holds its desired shape. After a period of up to 15 minutes, the wool pack then exits oven 24 as insulation product 30.

It is to be understood that heat setting is an optional aspect of the present invention. Alternatively, the wool pack may be encapsulated with an exterior plastic layer as taught by Schelhorn et al, U.S. Pat. No. 5,277,955, the disclosure of which is hereby incorporated by reference. Further, the wool pack may be subjected to other fabrication techniques including stitching, needling, or hydro-entanglement.

Figure 2:
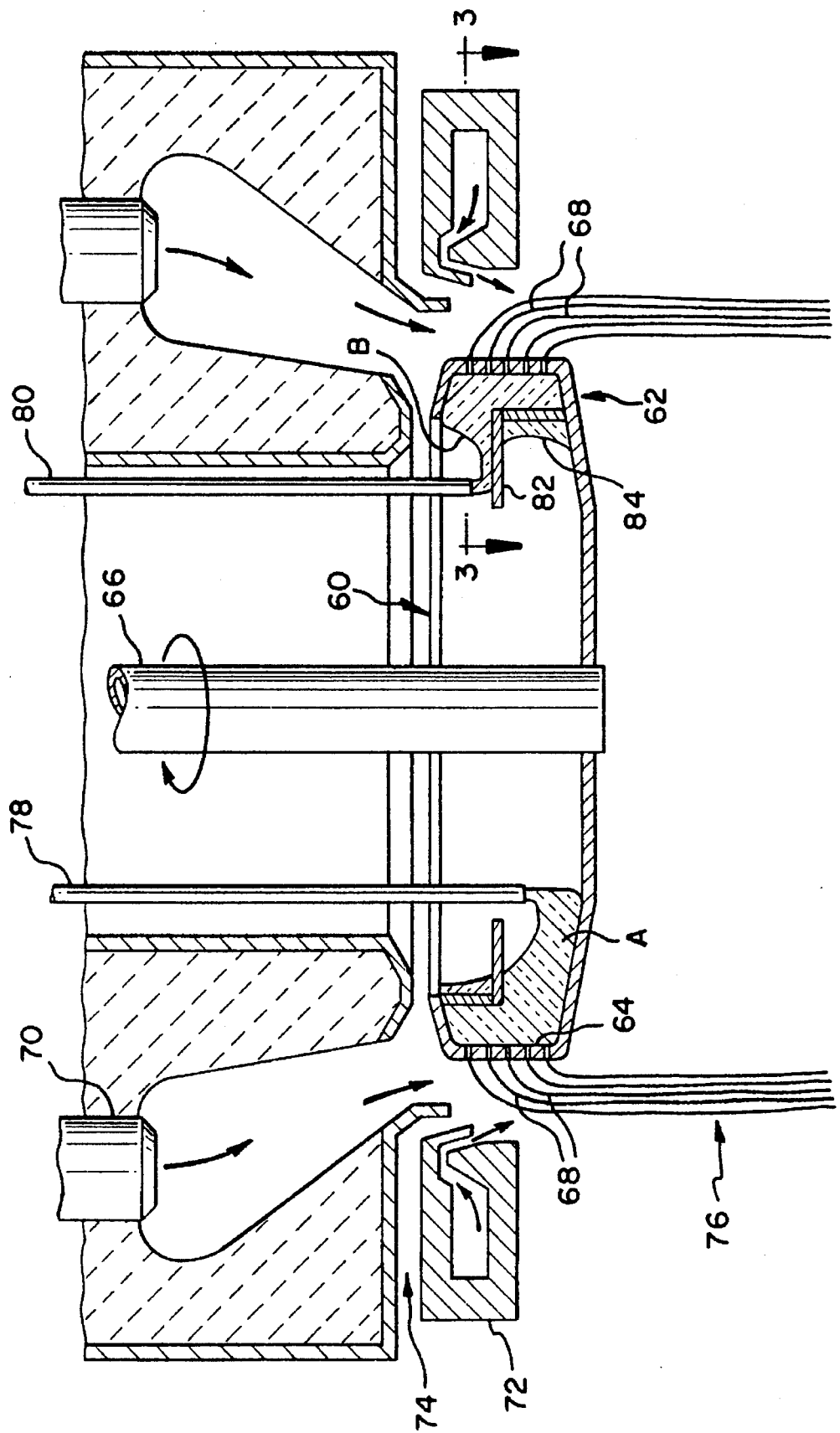
FIG. 2 is a cross-sectional view in elevation of the fiberizer/spinner used in the practice of the invention.

As shown in FIG. 2, spinner 60 includes a spinner peripheral wall 64 and a spinner bottom wall 62. The spinner is rotated on spindle 66, as is known in the art. The rotation of the spinner centrifuges molten glass through orifices in spinner peripheral wall 64 to form primary fibers 68. The primary fibers 68 are maintained in a soft, attenuable condition by the heat of annular burner 70. An internal burner (not shown) may also be used to provide heat to the interior of spinner 60. Annular blower 72, using induced air through passage 74, is positioned to pull primary fibers 68 and further attenuate them into secondary dual-glass fibers 76, suitable for use in wool insulating materials. The dual-glass irregularly-shaped glass fibers are then collected on a conveyor (as shown in FIG. 1) for formation into a wool pack.

The interior of spinner 60 is supplied with two separate streams of molten glass, first stream 78 containing glass A and second stream 80 containing glass B. The glass in stream 78 drops directly onto spinner bottom wall 62 and flows outwardly due to the centrifugal force toward spinner peripheral wall 64 to form a head of glass A as shown. Glass B in molten glass stream 80 is positioned closer to spinner peripheral wall 64 than stream 78, and the B glass in stream 80 is intercepted by horizontal flange 82 before it can reach the spinner bottom wall. Thus, a build-up or head of glass B is formed above horizontal flange 82 as shown.

Figure 3:
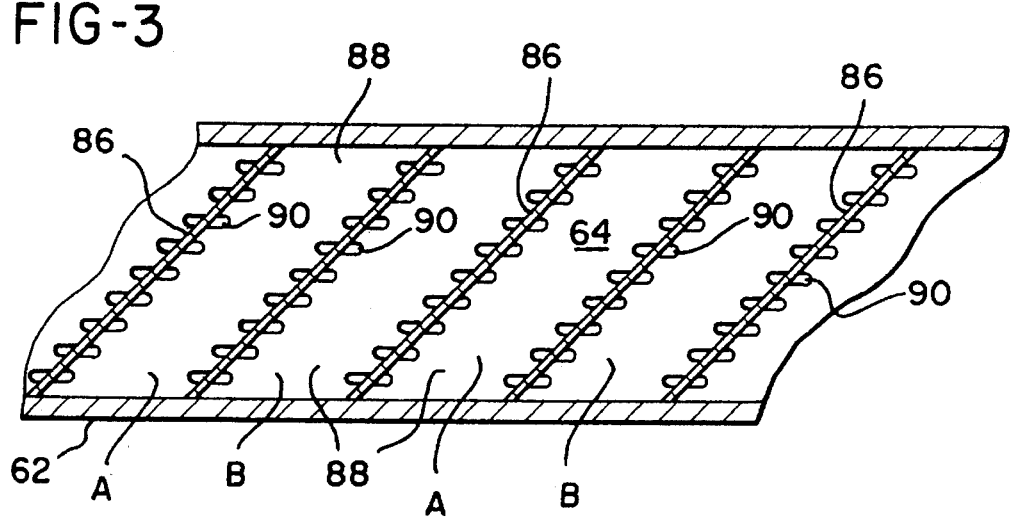
FIG. 3 is a schematic view in elevation of the peripheral wall of the fiberizer/spinner.
Figure 4:
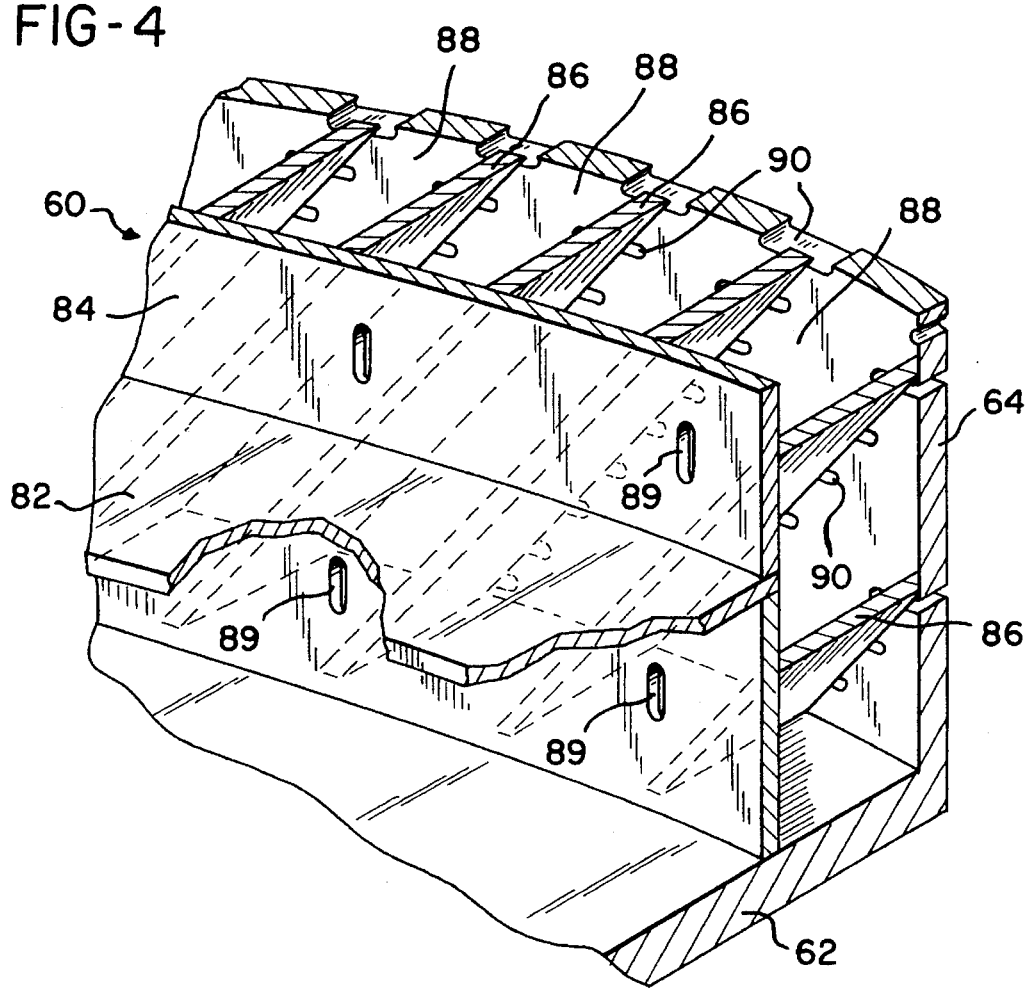
FIG. 4 is a perspective view taken from the interior of the spinner showing the dividers and compartments for the A and B components.

As shown in FIGS. 3 and 4, the spinner 60 is adapted with a vertical interior wall 84 which is generally circumferential and positioned radially inwardly from the spinner peripheral wall 64. A series of baffles 86, positioned between spinner peripheral wall 64 and vertical interior wall 84, divide that space into a series of generally angled compartments 88 which run substantially the entire height of spinner peripheral wall 64. The baffles are preferably angled at from about 5° to about 75° from vertical, and most preferably at about 45° from vertical. Alternate compartments contain glass A and glass B which flow, respectively, into compartments 88 through slots 89 in interior wall 84. It can be seen that horizontal flange 82, vertical interior wall 84, and baffles 86 together comprise a divider for directing glasses A and B into alternating adjacent compartments 88 so that every other compartment contains glass A while the remaining compartments contain glass B.

The spinner peripheral wall is adapted with orifices 90 which are positioned adjacent the radially outward end of baffles 86. The orifices have a width greater than the width of the baffles, thereby providing communication with each of two adjacent compartments 88 to enable centrifuging of both the A and B glasses from a single orifice. Orifices 90 may be drilled into the spinner wall by any of several known drilling techniques such as laser drilling, electrical discharge milling (EDM), electron beam drilling, or mechanical drilling.

The elongated orifices 90 have an aspect ratio within the range of from about 4:1 to about 30:1, and preferably from about 5:1 to about 25:1. Typically, the orifices have a height of from about 0.005 to about 0.040 inches (0.125 to about 1.0 mm) and lengths varying from about 0.1 to about 0.3 inches (2.5 to about 7.5 mm). The orifices are preferably sized to meter or restrict the flow of molten thermoplastic materials through them. This enables a head of molten thermoplastic material to be built up and established in the compartments 88 of spinner 60.

As can be seen from FIG. 4, each compartment 88 runs the entire height of peripheral wall 64, with orifices 90 running along the entire length of baffle 86. By angling the baffles, and thus the rows of orifices, the number of orifices on the spinner peripheral wall can be increased while still maintaining a minimum required spacing between orifices for the structural integrity of the spinner. For example, angling the baffles at 45° will permit approximately 1.4 times more the number of orifices than vertically-aligned baffles. Increasing the number of orifices thus increases the throughput of molten thermoplastic material that the spinner can process, increasing fiber production.

To minimize fiber interference as the multiple fibers are centrifuged from the orifices, the orifices may be sized to provide a throughput differential (ratio) of the thermoplastic materials between orifices of from about 2:1 to 10:1. By varying the throughput, the distances that individual fibers are spun outwardly from the spinner peripheral wall will vary. Thus, when the fibers are turned downward by gravity and hot air blasts and are attenuated, they will be less likely to become entangled and broken into short segments.

Generally, the orifices 90 are arranged in rows. To vary the throughput, the width of the orifices may be varied in stepwise fashion or linearly. Further, adjacent rows of orifices may be offset from one another.

Figure 5:
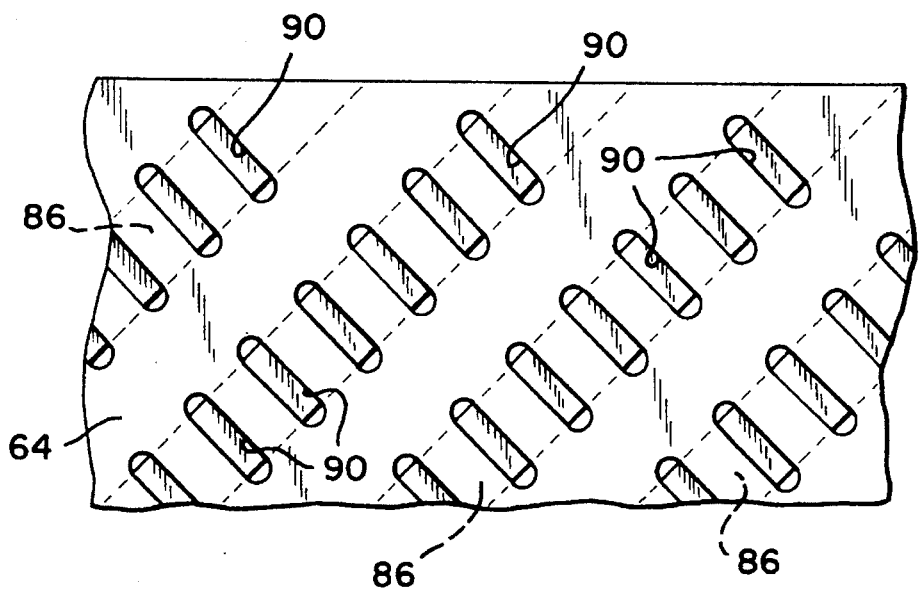
FIG. 5 is a schematic view, in elevation, of the peripheral wall of the spinner showing a different embodiment of the invention.
Figure 6:
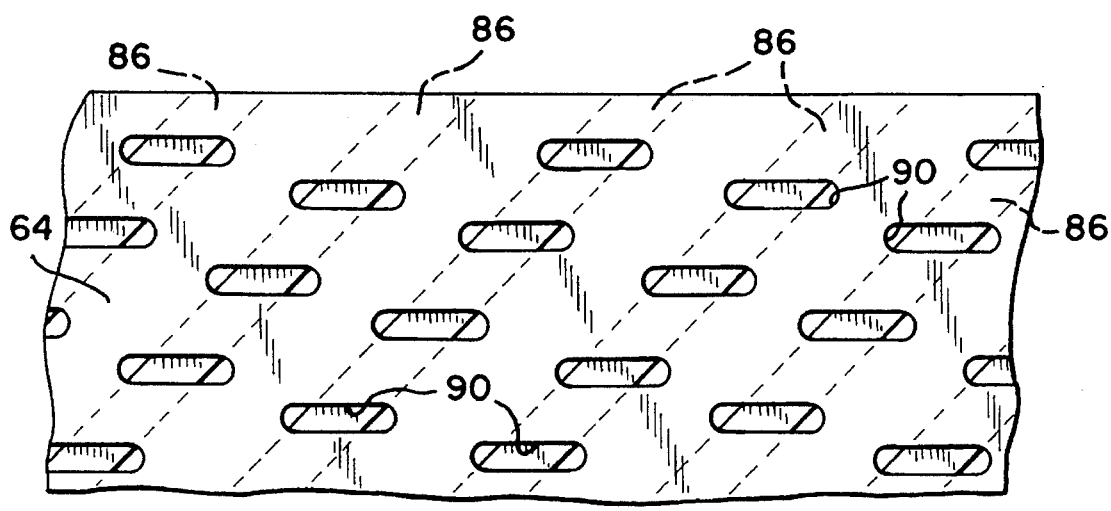
FIG. 6 is also a schematic view, in elevation, of the peripheral wall of the spinner showing yet a different embodiment of the invention.

FIGS. 5 and 6 show alternate embodiments of the invention. In FIG. 5 the orifices are elongated; the long axes (major axes) of the orifices 90 are normal to the baffles 86 to provide another variant in the flow of molten thermoplastic materials from the spinner. In FIG. 6, the long axes of the orifices are generally horizontal, but the adjacent rows of orifices are offset from one another.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

I claim:

1. Apparatus for making dual component fibers comprising:
   a) a spinner having a peripheral wall, said spinner being divided into a series of compartments by baffles positioned around the interior of said spinner, said baffles being at an angle of from about 5° to about 75° from vertical;
   b) equipment for supplying first and second molten thermoplastic materials to said spinner;
   c) a divider for directing said first molten thermoplastic material into alternate ones of said compartments and for directing said second molten thermoplastic material into the remaining ones of said compartments so that adjacent compartments contain different thermoplastic materials; and
   d) said peripheral wall of said spinner including a series of orifices therein, said orifices being positioned in alignment with said baffles and being wider than the thickness of said baffles to provide communication between adjacent compartments to enable centrifuging of said first and second thermoplastic materials from each single orifice to form dual component fibers.

2. An apparatus as claimed in claim 1 in which said angle is about 45° from vertical.

3. An apparatus as claimed in claim 1 in which said orifices are elongated and the major axis of said orifices is generally horizontal.

4. An apparatus as claimed in claim 1 in which said orifices are elongated and the major axis of said orifices is generally normal to said baffles.

5. An apparatus as claimed in claim 1 in which said orifices are sized to provide a throughput ratio of said thermoplastic materials between orifices of from about 2:1 to 10:1.

6. An apparatus as claimed in claim 5 in which said orifices are arranged in rows, and the width of said orifices is varied in stepwise fashion.

7. An apparatus as claimed in claim 6 in which adjacent rows of orifices are offset from one another.

8. All apparatus as claimed in claim 5 in which said orifices are arranged in rows, and the width of said orifices is varied linearly.

9. An apparatus as claimed in claim 8 in which adjacent rows of orifices are offset from one another.

10. Apparatus for making dual component fibers comprising:
    a) a spinner having a peripheral wall, said spinner being divided into a series of compartments by baffles positioned around the interior of said spinner wall, said baffles being at an angle of from about 5° to about 75° from vertical;
    b) equipment for supplying first and second molten thermoplastic materials to said spinner;
    c) a divider for directing said first molten thermoplastic material into alternate ones of said compartments and for directing said second molten thermoplastic material into the remaining ones of said compartments so that adjacent compartments contain different thermoplastic materials; and
    d) said peripheral wall of said spinner including a series of orifices therein, said orifices being positioned in alignment with said baffles and being wider than the thickness of said baffles to provide communication between adjacent compartments to enable centrifuging of said first and second thermoplastic materials from each single orifice to form dual component fibers, said orifices being sized to provide a throughput ratio of said thermoplastic materials between orifices of from about 2:1 to 10:1.

\* \* \* \* \*